United States Patent
Hussain

(10) Patent No.: US 7,552,316 B2
(45) Date of Patent: Jun. 23, 2009

(54) METHOD AND APPARATUS FOR COMPRESSING INSTRUCTIONS TO HAVE CONSECUTIVELY ADDRESSED OPERANDS AND FOR CORRESPONDING DECOMPRESSION IN A COMPUTER SYSTEM

(75) Inventor: Zahid Hussain, Ascot (GB)

(73) Assignee: Via Technologies, Inc., Hsin-Tien, Taipei (TW)

( * ) Notice: Subject to any disclaimer, the term of this patent is extended or adjusted under 35 U.S.C. 154(b) by 571 days.

(21) Appl. No.: 10/898,784

(22) Filed: Jul. 26, 2004

(65) Prior Publication Data

US 2006/0020772 A1    Jan. 26, 2006

(51) Int. Cl.
*G06F 9/00* (2006.01)

(52) U.S. Cl. .................................. 712/220; 712/208
(58) Field of Classification Search ......... 712/205–207, 712/204, 300, 20, 208, 220; 709/247
See application file for complete search history.

(56) References Cited

U.S. PATENT DOCUMENTS

| | | | |
|---|---|---|---|
| 4,258,419 A * | 3/1981 | Blahut et al. ................. | 712/210 |
| 5,968,167 A * | 10/1999 | Whittaker et al. ........... | 712/225 |
| 6,559,842 B1 | 5/2003 | Deering et al. | |
| 2001/0047466 A1 | 11/2001 | Topham | |

* cited by examiner

*Primary Examiner*—Alford W Kindred
*Assistant Examiner*—Benjamin P Geib

(57) ABSTRACT

The apparatus and methods improve performance in a computer system by compressing a plurality of instructions having the same function with consecutively addressed operands and decompressing the compressed instruction by replicating the instruction with incremented operands.

20 Claims, 9 Drawing Sheets

COMPRESSION OF INSTRUCTIONS

OPERAND FIELD IDENTIFIER TABLE

| BIT 54 | BIT 53 | | |
|---|---|---|---|
| 0 | 0 | THREE SOURCE OPERAND | NO COMPRESSION |
| 0 | 1 | REGISTER-REGISTER OPERATION | COMPRESSION |
| 1 | 0 | REGISTER-IMMEDIATE OPERATION | COMPRESSION |
| 1 | 1 | BRANCH OPERATION | NO COMPRESSION |

METHOD AND APPARATUS FOR COMPRESSING INSTRUCTIONS TO HAVE CONSECUTIVELY ADDRESSED OPERANDS AND FOR CORRESPONDING DECOMPRESSION IN A COMPUTER SYSTEM

TECHNICAL FIELD

The present invention generally relates to computer systems, and more particularly to a method and apparatus for compressing and decompressing instructions in a computer system.

BACKGROUND OF THE INVENTION

As is known, the art and science of three-dimensional ("3-D") computer graphics concerns the generation, or rendering, of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of a vertex or a set of vertices, for example, coordinate (x, y, z) that defines a point, for example, the endpoint of a line segment, or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processor, these stages include, for example, per vertex operations, primitive assembly operations, pixel operations, texture assembly operations, rasterization operations, and fragment operations.

In a typical graphics display system, an image database (e.g., a command list) may store a description of the objects in the scene. The objects are described with a number of small polygons, which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For three-dimensional objects with complex curved surfaces, the polygons in general must be triangles or quadrilaterals, and the latter can always be decomposed into pairs of triangles.

A transformation engine transforms the object coordinates in response to the angle of viewing selected by a user from user input. In addition, the user may specify the field of view, the size of the image to be produced, and the back end of the viewing volume so as to include or eliminate background as desired.

Once this viewing area has been selected, clipping logic eliminates the polygons (i.e., triangles) which are outside the viewing area and "clips" the polygons, which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model is next applied taking into account the light sources. The polygons with their color values are then transmitted to a rasterizer.

For each polygon, the rasterizer determines which pixel positions the polygon and attempts to write the associated color values and depth (Z value) into frame buffer cover. The rasterizer compares the depth values (Z) for the polygon being processed with the depth value of a pixel, which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, a video controller displays the contents of a frame buffer on a display a scan line at a time in raster order.

With this general background provided, reference is now made to FIG. 1, which shows a functional flow diagram of certain components within a graphics pipeline in a computer graphics system. It will be appreciated that components within graphics pipelines may vary from system, and may also be illustrated in a variety of ways. As is known, a host computer 10 (or a graphics API running on a host computer) may generate a command list 12, which comprises a series of graphics commands and data for rendering an "environment" on a graphics display. Components within the graphics pipeline may operate on the data and commands within the command list 12 to render a screen in a graphics display.

In this regard, a parser 14 may retrieve data from the command list 12 and "parse" through the data to interpret commands and pass data defining graphics primitives along (or into) the graphics pipeline. In this regard, graphics primitives may be defined by location data (e.g., x, y, z, and w coordinates) as well as lighting and texture information. All of this information, for each primitive, may be retrieved by the parser 14 from the command list 12, and passed to a vertex shader 16. As is known, the vertex shader 16 may perform various transformations on the graphics data received from the command list. In this regard, the data may be transformed from World coordinates into Model View coordinates, into Projection coordinates, and ultimately into Screen coordinates. The functional processing performed by the vertex shader 16 is known and need not be described further herein. Thereafter, the graphics data may be passed onto rasterizer 18, which operates as summarized above.

Thereafter, a z-test 20 is performed on each pixel within the primitive being operated upon. As is known, comparing a current z-value (i.e., a z-value for a given pixel of the current primitive) in comparison with a stored z-value for the corresponding pixel location performs this z-test. The stored z-value provides the depth value for a previously rendered primitive for a given pixel location. If the current z-value indicates a depth that is closer to the viewer's eye than the stored z-value, then the current z-value will replace the stored z-value and the current graphic information (i.e., color) will replace the color information in the corresponding frame buffer pixel location (as determined by the pixel shader 22). If the current z-value is not closer to the current viewpoint than the stored z-value, then neither the frame buffer nor z-buffer contents need to be replaced, as a previously rendered pixel will be deemed to be in front of the current pixel.

Again, for pixels within primitives that are rendered and determined to be closer to the viewpoint than previously-stored pixels, information relating to the primitive is passed on to the pixel shader 22. The pixel shader 22 then determines color information for each of the pixels within the primitive that are determined to be closer to the current viewpoint. Once color information is computed by the pixel shader 22, the information is stored within the frame buffer 24 for subsequent display.

As is known, the above discussed computer graphics processing functions are data and instruction intensive therefore will realize improved efficiencies from systems and methods of instruction compression and decompression.

SUMMARY

Embodiments of the present invention provide a computer system having compression logic configured to compress a plurality of instructions, wherein the plurality of instructions comprises a plurality of operands, wherein each of the plurality of instructions comprises one of the plurality of operands, wherein the plurality of operands is allocated to a plurality of consecutive registers, wherein each of the plurality of instructions further comprises a specific instruction function applied to one of the plurality of operands; decompression logic configured to decompress a compressed instruction, wherein the compressed instruction is expanded into a plurality of decompressed instructions; and instruction queue logic configured to store the plurality of instructions, further configured to store the compressed instruction, further configured to partition an instruction register, wherein the instruction register is comprised of a plurality of instruction queues, wherein the plurality of instruction queues comprises a first instruction queue, wherein the plurality of instruction queues further comprises a second instruction queue.

Embodiments of the present invention can also be viewed as providing methods for compressing and decompressing computer instructions. In this regard, one embodiment of such a method, among others, can be broadly summarized by the following steps: compressing a plurality of instructions, wherein the plurality of instructions comprises an instruction applied to a plurality of components of a value, wherein the plurality of instructions is compressed into a compressed instruction; and decompressing the compressed instruction, wherein decompressing comprises determining a number of the plurality of components of a value, wherein the decompressing further comprises determining which components of the compressed instruction to modify, wherein the decompressing further comprises storing decompressed instructions in an instruction register.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention.

Moreover, in the drawings, like reference numerals designate corresponding parts throughout the several views.

DETAILED DESCRIPTION

Figure 1:
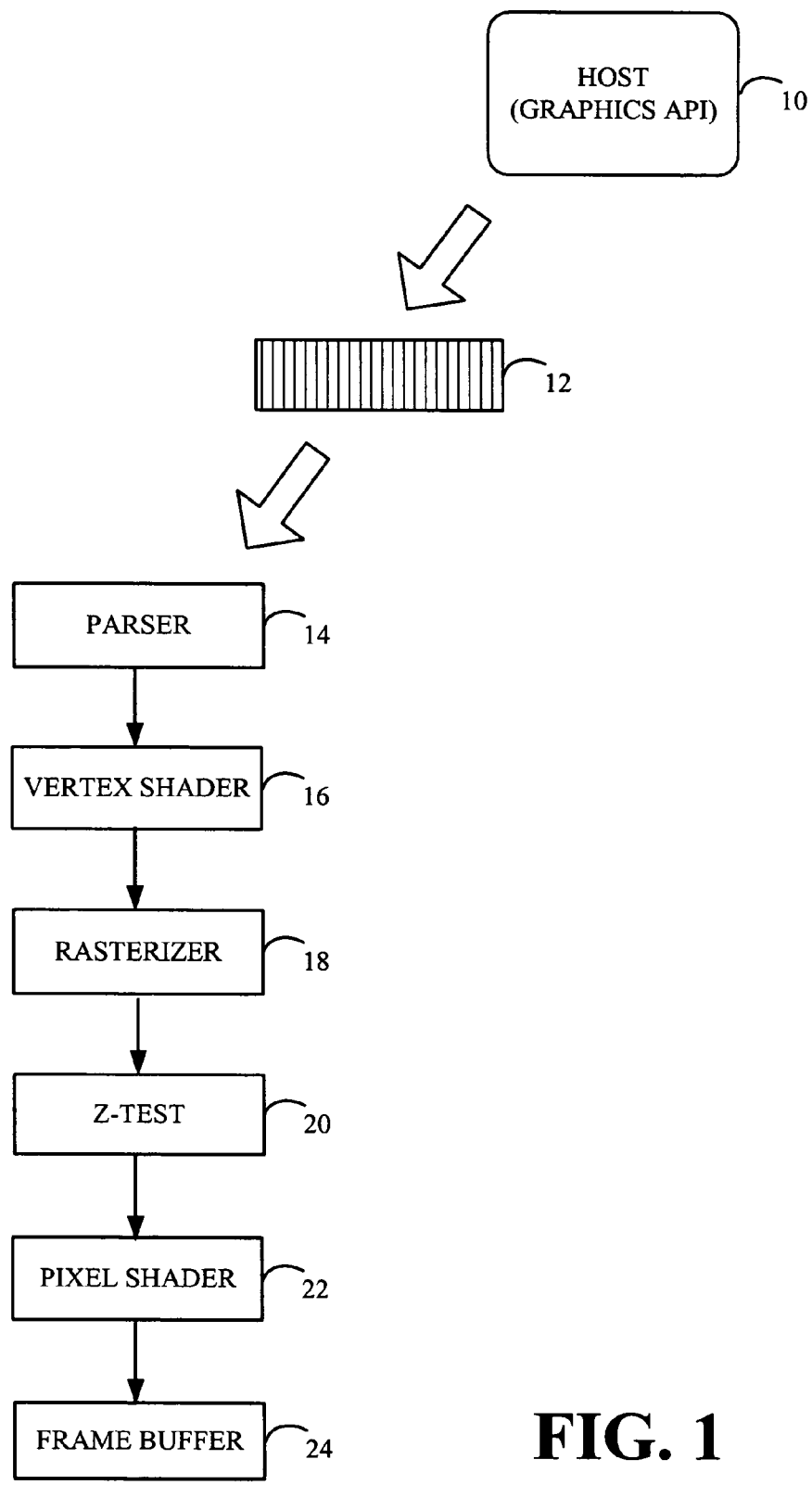
FIG. 1 is a block diagram of a conventional graphics pipeline, as is known in the prior art.

Having summarized various aspects of the present invention, reference will now be made in detail to the description of the invention as illustrated in the drawings. While the invention will be described in connection with these drawings, there is no intent to limit it to the embodiment or embodiments disclosed herein. On the contrary, the intent is to cover all alternatives, modifications and equivalents included within the spirit and scope of the invention as defined by the appended claims.

It is noted that the drawings presented herein have been provided to illustrate certain features and aspects of the embodiments of the invention. It will be appreciated from the description provided herein that a variety of alternative embodiments and implementations may be realized, consistent with the scope and spirit of the present invention.

As summarized above, the present application is directed to embodiments of apparatus, systems and methods of compressing and decompressing instructions in a computer system. Although exemplary embodiments are presented in the context of a computer graphics system, one of ordinary skill in the art will appreciate that the apparatus, systems and methods herein are applicable in any computer system featuring large amounts of data parallelism because the code may transformed to accumulate and compress such data operations.

Figure 2:
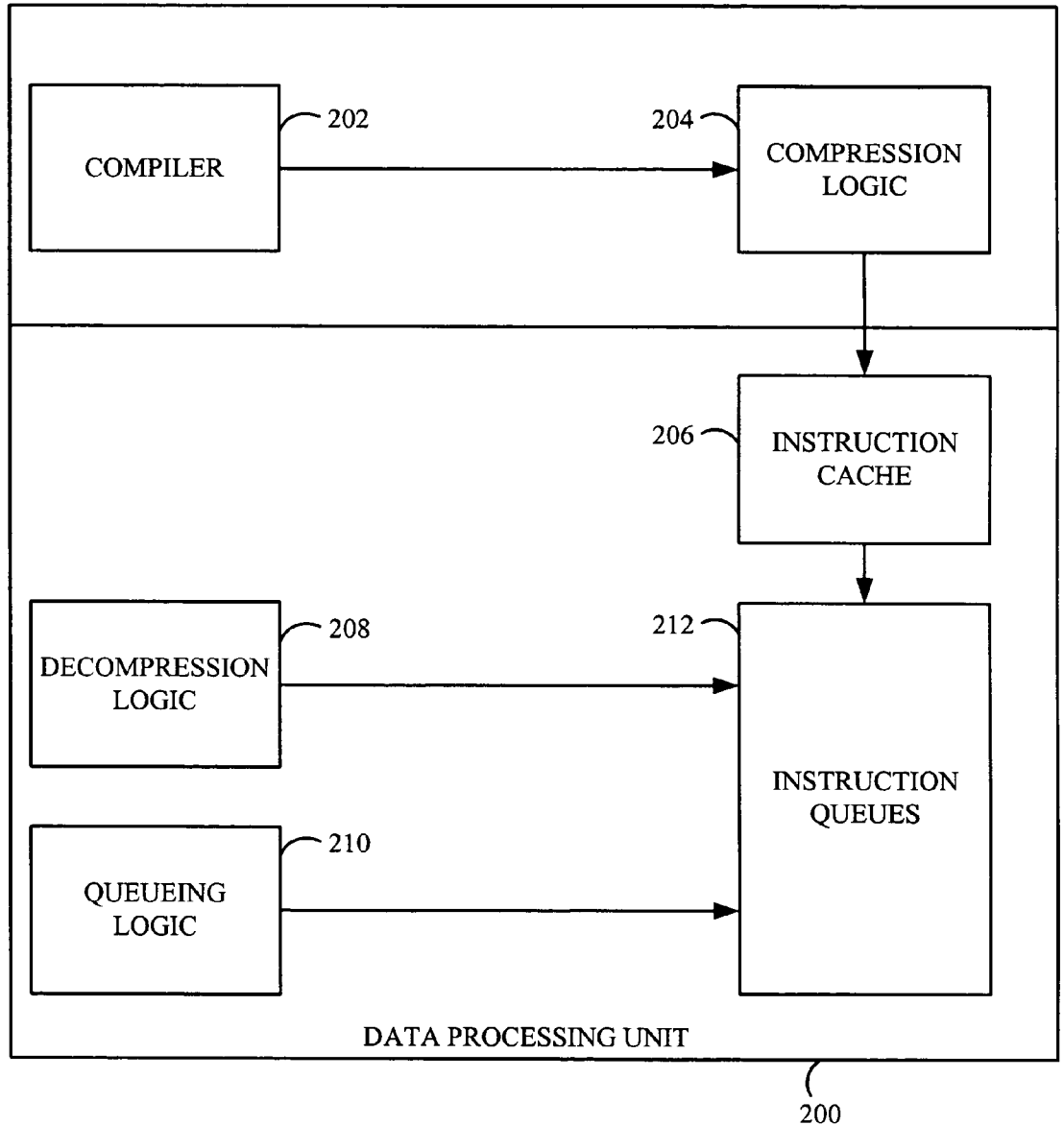
FIG. 2 is a block diagram illustrating select elements of an instruction compression/decompression system.
Figure 4:
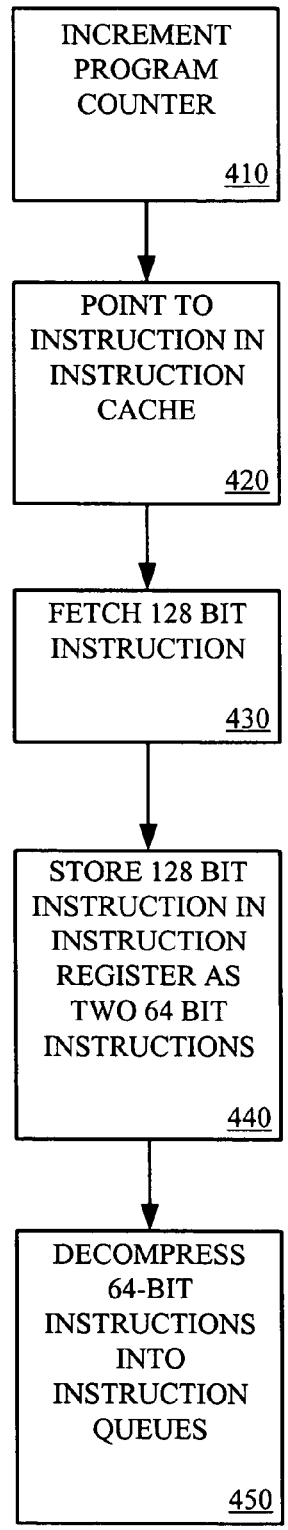
FIG. 4 is a block diagram illustrating instruction processing in one embodiment.

Reference is made briefly to FIG. 2, which illustrates a block diagram of select system components of an embodiment of the instruction compression/decompression method and apparatus. As illustrated, the compression/decompression system features data processing unit 200 utilizing a compiler 202, which applies compression logic 204 to multiple instructions. The compression logic 204 compresses multiple instructions into one instruction, which is then placed in an instruction cache 206. The compression may also be performed by the compression logic 204 within a compiler outside the data processing unit 200. As illustrated in FIG. 4, the compressed instruction remains in the instruction cache until the program counter points 420 to that instruction for execution.

When the program counter points 420 to the compressed instruction in the instruction cache 206, the compressed instruction is placed in the instruction queues 212 and decompressed using the decompression logic 208. The instruction queues 212 are managed and balanced with no-operation instructions by queueing logic 210. One of ordinary skill in the art will know that the decompression logic 208 and queuing logic 210 may either be external to or integrated within the instruction queues 212.

Figure 3:
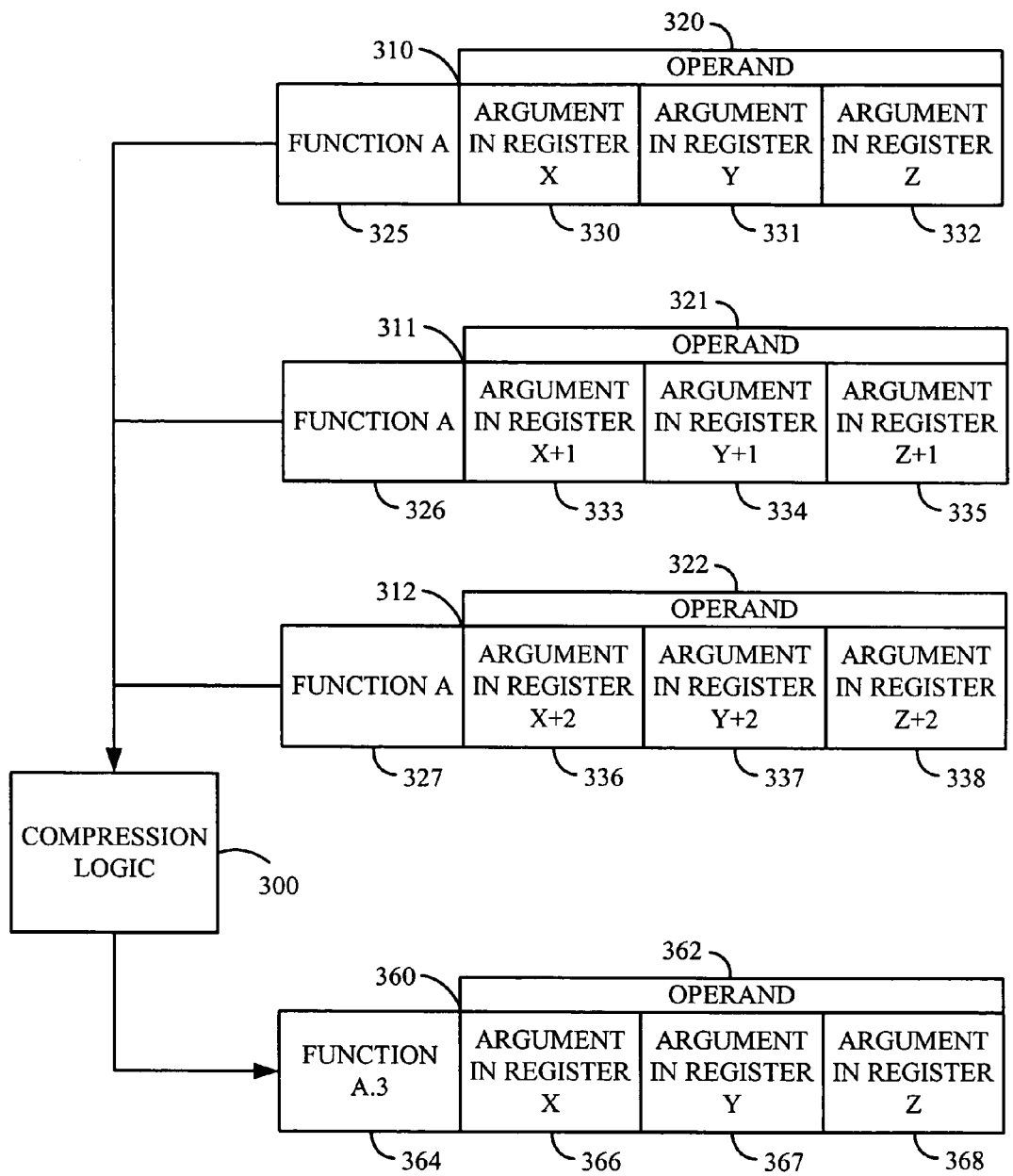
FIG. 3 is a block diagram illustrating one embodiment of an instruction compression method.

Reference is now made to FIG. 3, illustrating one embodiment of an instruction compression method. The uncompressed instructions 310-312 have the same instruction function "A" components 325-327 and operands 320-322 located in consecutive registers. A series of repetitive instructions with consecutive operands is typical of the graphics rendering pipeline stages of a pixel shader, z-test and vertex shader, for example.

This embodiment features instructions with operands 320-322 each having three arguments 330-338. The corresponding arguments in each of the three uncompressed instructions are in consecutively addressed registers. For example, the argument in the "X" register 330 of the first instruction 310 has corresponding consecutively addressed arguments in the "X+1" register 333 in the second instruction 311 and in the "X+2" register 336 in the third instruction 312. Accordingly, the "Y" and "Z" arguments 331-332 in the first instruction 310 have the same corresponding consecutive "+1" and "+2" arguments in the second and third instructions 311, 312.

Multiple instructions having the same instruction function and consecutively addressed operands are compressed by the compression logic 300 into a single compressed instruction 360. The compressed instruction 360 has an operand 362 with arguments 366-368 identical to the arguments 330-332 in the first uncompressed instruction 310. The compressed instruction 360 is modified 364 to further include data regarding the number of compressed instructions captured in the compression and identifier information regarding the data fields of the compressed instruction.

For example, the following Microsoft™ DX assembler instruction,

MUL R3.xyz, R4.yzw, R5.xyz may be expanded to the following three instructions by the compiler:

| MUL | R20, | R12, | R16 |
| MUL | R21, | R13, | R17 |
| MUL | R22, | R14, | R18 |

These instructions may then be compressed to:

FMUL.3 R20, R12, R16

Note that the consecutive register allocation is a requirement under this compression scheme. Therefore, the code MUL R10.xzy, R10.xyz, R.yzw will not be compressed since the register allocation is not consecutive. To compress an instruction with non-consecutive registers, the compiler would have to reassign a register, thus reducing the benefits of the compression scheme. Note that the operands of this example can be vectors, arrays of vectors, or a combination thereof.

Reference is now briefly made to FIG. 4, a block diagram illustrating one embodiment of instruction processing. The program counter 410 points to an instruction in the instruction cache 420, where the instruction cache contains instructions related to specific process threads. As mentioned in relation to FIG. 2, an instruction is fetched 430 from the instruction cache and placed in the instruction register 440 for a specific process thread. An instruction decompression can occur every cycle and the instructions are decompressed into the instruction queues 450 for subsequent execution.

Figure 5:
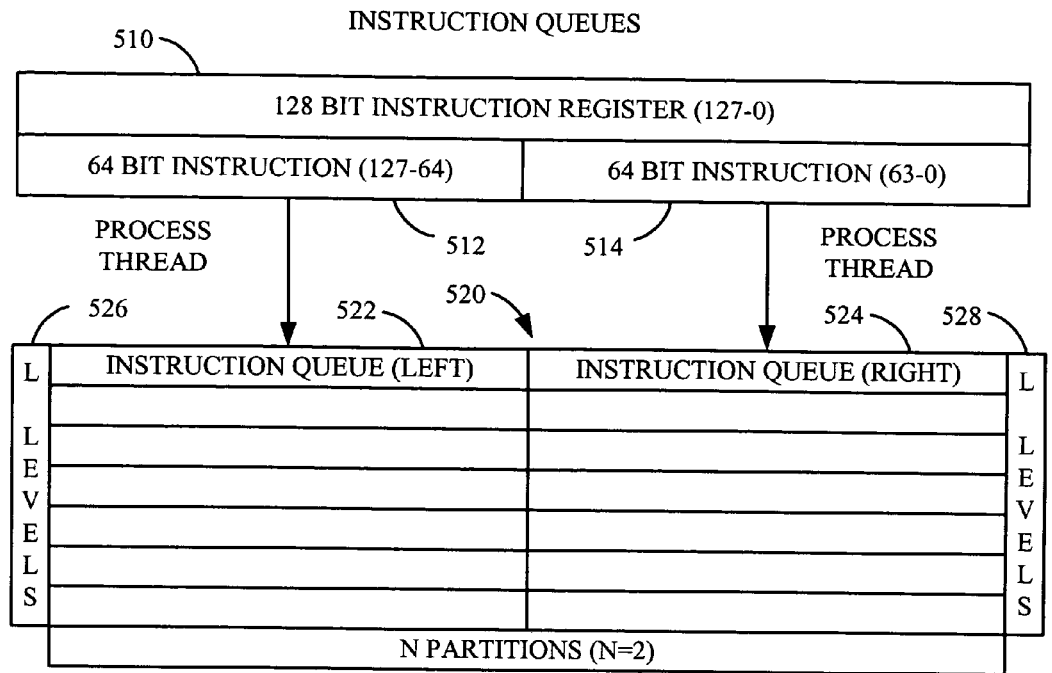
FIG. 5 is a diagram illustrating one embodiment of the format for the instruction register and instruction queues.

As illustrated in FIG. 5, the instruction register 510 and instruction queues 520 of this embodiment are configured as 128 bits divided into two 64-bit instructions 512, 514. An alternative embodiment may be configured as a different size instruction register, where that register could contain more than two instructions per data string. Thus, the number of partitions "N" 521 could be a number other than two. For example, in a 128-bit system utilizing less data intensive instruction functions and arguments, an instruction register could contain four 32-bit instructions, such that "N" 521 equals four. Regardless of the size of the instruction register 510 and the number of partitions 521, each individual instruction queue may be dedicated to processing a different process thread of the system.

The separate 64-bit instruction queues 522, 524 each have dedicated instruction decompression functionality. Each queue is simultaneously loaded with the corresponding 64-bit instruction. The instruction queue 520 of this embodiment is seven levels deep, such that "L" 526, 528 equals seven. If less than four levels are available, the process threads associated with those instructions will stall until at least four levels are available in each queue. The four level capacity requirement is necessary because in addition to receiving the compressed instruction, the instruction queues 522, 524 store the multiple instructions that are decompressed from the compressed instruction. Therefore, the instruction queues 522, 524 must have the capacity to store the compressed instruction function and up to three decompressed instructions.

One of ordinary skill in the art will recognize that the instruction queues may be configured with a number of levels other than seven, as in the above embodiment, such that "L" 526, 528 is a number other than seven. Correspondingly, the maximum number of decompressed instructions, and thus the minimum available instruction queue capacity to avoid stalling, may be a number other than four. The value of this number would necessarily be less than the total number of levels, "L," 526, 528 and correlate to the maximum number of instructions available for compression in the particular embodiment.

Figure 6:
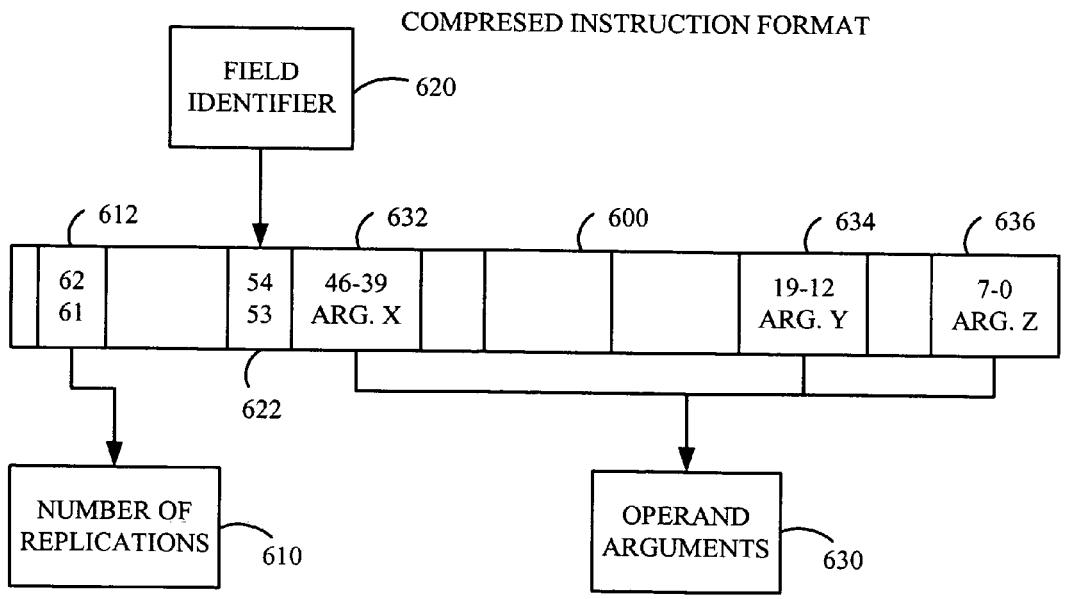
FIG. 6 is a diagram illustrating the format of one embodiment of a compressed instruction.

Reference is now made to FIG. 6, which illustrates the data format of the compressed instruction of this embodiment. The compressed instruction 600 utilizes the value in the field 612, bits 62 and 61, to indicate the number of replications 610 required in decompression.

The number of replications corresponds to the number of uncompressed instructions that were compressed by the compiler. Additionally, this value, as discussed below, is used to determine the maximum replications between the left and right instruction queues.

Bits 54 and 53 define the data field 622, which stores a field identifier value 620. The field identifier value 620 identifies whether the instruction is suitable for compression and, if compressed, which of the operand arguments 630 require modification in decompression. In this embodiment, the arguments 632, 634, 636 can be defined in three eight-bit fields, depending on how many arguments the specific instruction function requires. It will be appreciated that different functions may operate on one or more operand arguments in each instruction. The instruction function would be defined, for example, in one of the fields not discussed in FIG. 6. Additionally, in the figures, the X, Y and Z labels for the corresponding arguments 632, 634 and 636 have no correlation with any coordinate system labels and are only for the purpose of distinguishing each argument from the other arguments in the same instruction.

Using the above example of a compressed instruction, the value in the number of replications field, bits 62 and 61, would be "11" to correspond with the binary expression for the three instructions that are compressed into one compressed instruction. The field identifier value 620 at bits 54-53 622 would be "01" since the operation is register-register. Accordingly, the operand arguments 630 at bit ranges 46-39, 19-12, and 7-0 would be the addresses of registers R20, R12 and R16, respectively. The code for the instruction function "MUL" would be stored in a field within the 38-20 bit range.

Figures 7, 8:
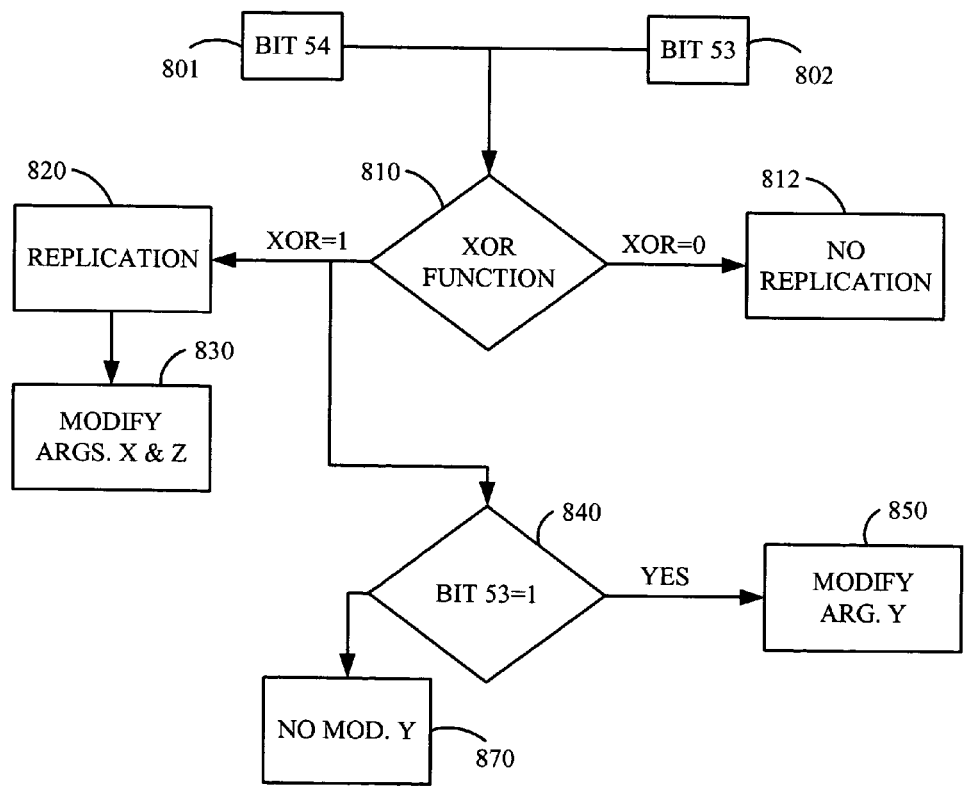
FIG. 7 is a table providing the definitions of the operand field identifier values in one embodiment.
FIG. 8 is a block diagram illustrating the field identifier logic of one embodiment.

Definitions of the values of the field identifier 620 in one embodiment are listed in the table of FIG. 7. By way of example, the compression method of this embodiment results in compression only when the instruction is a register-register operation or a register-immediate operation. Limiting the compression to instructions having these two types of operations results in greater efficiency because the compression method relies on operands located in consecutively addressed registers.

Reference is now made to FIG. 8, a block diagram illustrating an embodiment of logic for using the field identifier data to determine which arguments are to be modified during decompression. As discussed above, the field identifier is comprised of bit 54 801 and bit 53 802. Since compression is not performed when both bits are zero or when both bits are one, an exclusive OR (XOR) logic function 810 is performed on bits 54 and 53 801-802 to determine whether the replication associated with decompression is necessary. If the XOR result equals zero, then there is no replication 812, and thus no decompression. If the result of the XOR equals one then replication of the instruction is performed 820. In this embodiment, values in the X and Z argument fields 632, 636 are modified 830 for each replication. Further, if bit 53 is one 840, then the value in the Y argument field is also modified 850. Correspondingly, if bit 53 is zero, then the value in the Y argument field is not modified 870.

Using the above example, the operand field identifier is "01" therefore the XOR function 810 would yield a value of 1, indicating that replication of the instruction should occur. Since the arguments stored in the "X" and "Z" locations will be modified regardless of whether the field identifier value is "01" or "10," the XOR value of "1" dictates that the R20 and R16 arguments of this example should be modified. The R20 argument is modified in subsequent decompressed instructions to generate arguments R21 and R22, corresponding to the original instructions before they were compressed. Accordingly, the R16 argument is modified to generate arguments R17 and R18 in the subsequent decompressed instructions.

Additionally, if bit 53 has a value of 1 due to a field identifier value of "01," then the corresponding operation is performed relative to the R12 argument. Thus, the bit test of the 53 bit distinguishes between a register-register operation and a register-immediate operation, as shown in the table of FIG. 7.

Figure 9:
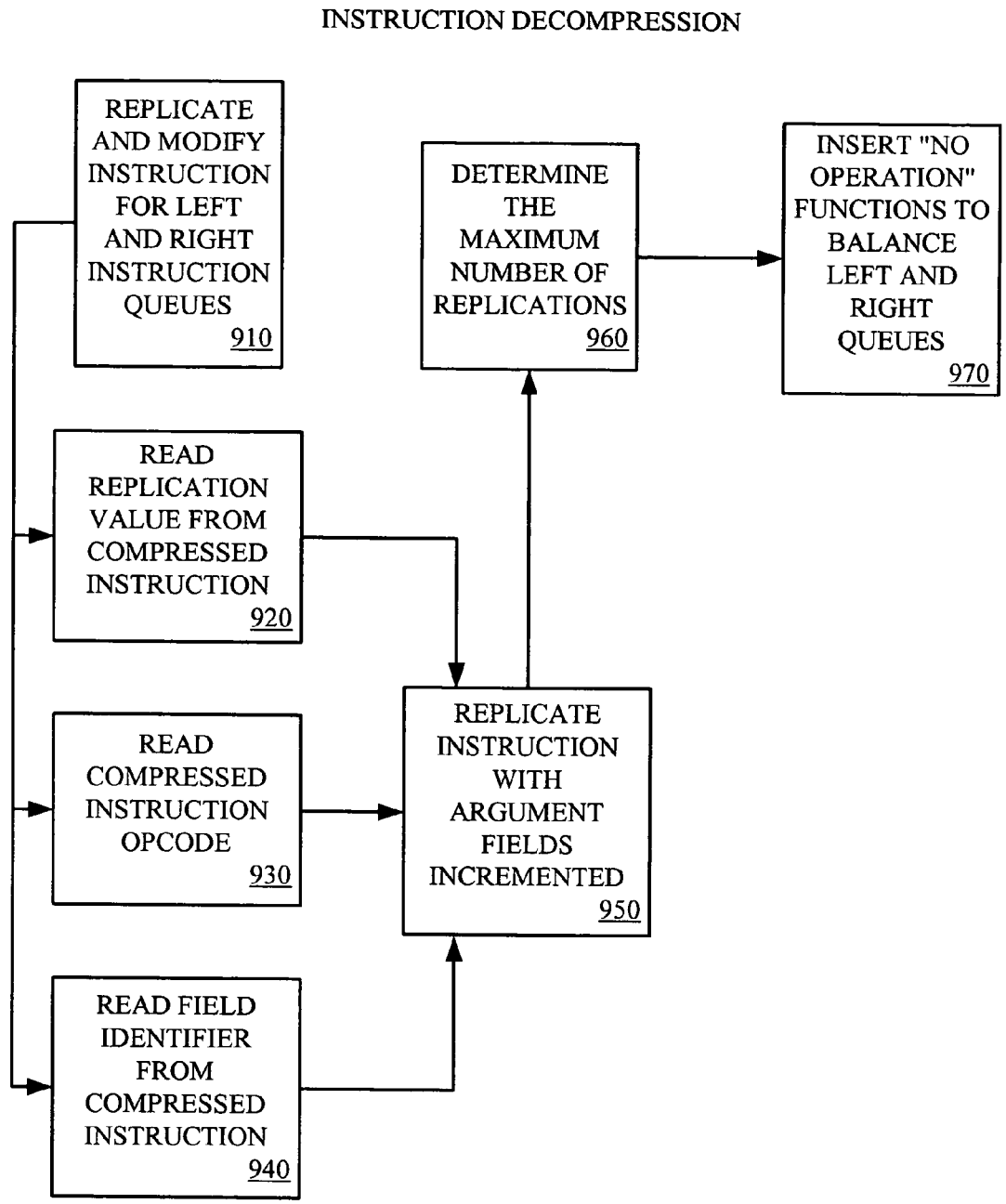
FIG. 9 is a block diagram illustrating instruction decompression in one embodiment.

A block diagram of one embodiment of instruction decompression is illustrated in FIG. 9. To achieve the replication and modification of the instruction for the left and right instruction queues 910, the replication value is read from the compressed instruction 920.

As discussed above, the replication value is determined by the number of instructions compressed into the compressed instruction and determines how many decompressed instructions are generated during decompression. In the above code example, the replication value would be three or "11." Additionally, the compressed instruction opcode and field identifiers are read 930, 940. The compressed instruction opcode is read because it will be reproduced without modification in the replicated instructions. For example, in the above example, the instruction opcode in each of the replicated instructions will correspond to the "MUL" function.

The field identifiers are read to determine which of the operand fields is to be modified in the replicated instructions that are generated during the decompression. As discussed above, the field identifier value of "01" requires that all three operand fields be modified in the replicated instructions. Having the number of replications, the instruction function from the opcode and the field identifier data, the instruction is replicated with the corresponding argument fields incremented for each replication 950.

The maximum number of replications in the left and right instruction queues is determined 960. This maximum is used to balance the left and right instruction queues by inserting no-operation functions in any queue 970 where the number of replications is less than the maximum. Thus, including the no-operation instructions, all instruction queues store the same number of instructions per cycle. This balancing function is necessary maintain the proper instruction sequence since, in this embodiment for example, the left and right instruction queues are loaded and accessed in the form of a single data block.

By way of example, assume the compressed instruction of the above example, having a replication value of three, is in the left queue and another compressed instruction having a replication value of two is in the right queue. The two different replication values would be compared to determine the maximum, which in this example is three. The number of no-operation instructions inserted into the left and right instruction queues is the difference, between the maximum, three, and the replication values of the respective queues. Thus, in this example, the left queue would not have any no-operation instructions inserted because it has the maximum number of instructions. In contrast, the right instruction queue would have one no-operation instruction inserted to bring the total from two up to the same number as the maximum of three.

Figure 10:
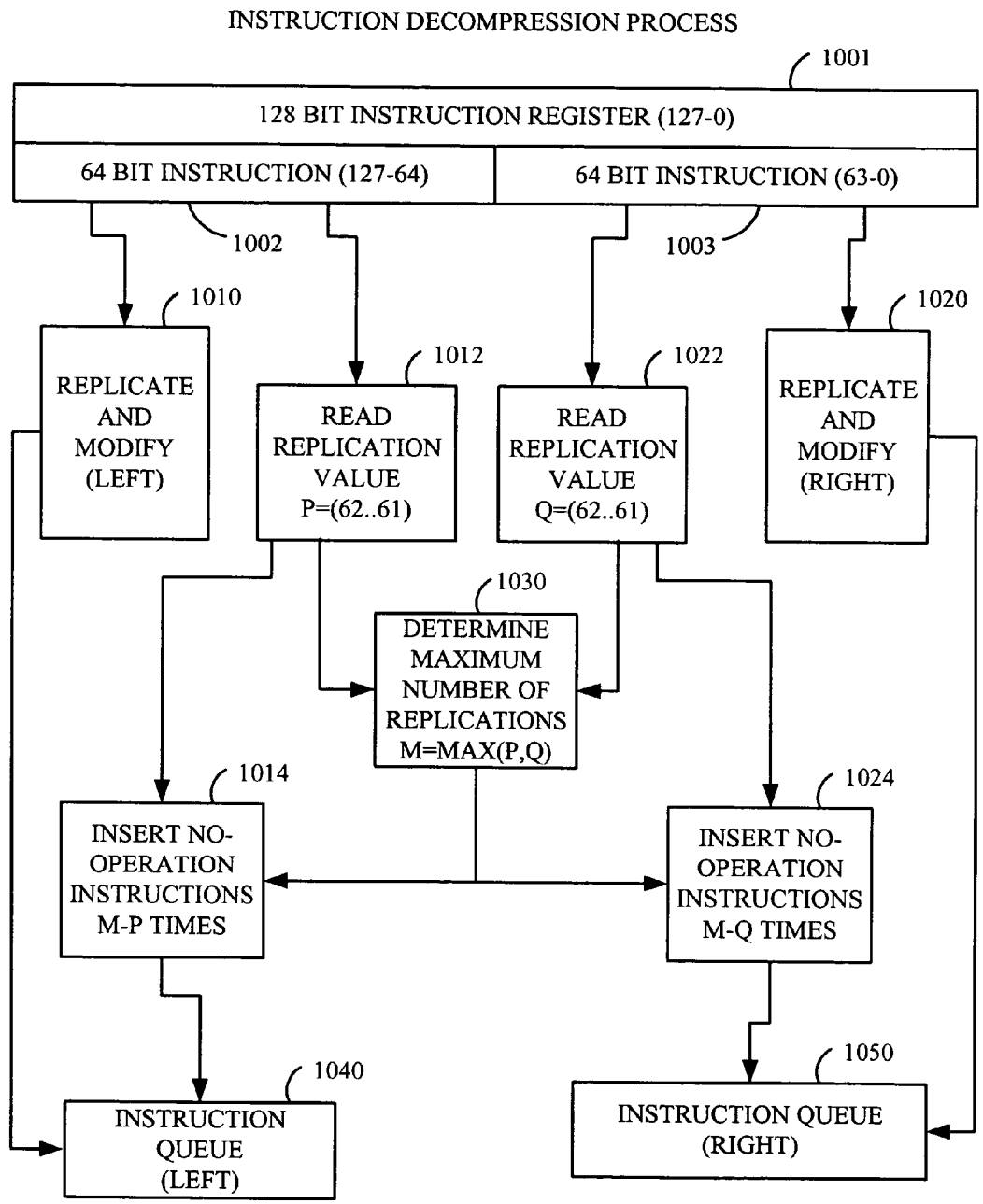
FIG. 10 is a block diagram illustrating the logic for instruction decompression in one embodiment.

Reference is now made to FIG. 10, which illustrates a block diagram of the instruction decompression process in one embodiment. The 128-bit instruction register 1001, defined by bits 127-0, is logically divided into two 64-bit instructions, defined by bits 127-64 1002 and bits 63-0 1003. By partitioning the 128-bit data string, the instruction register supports multiple process threads simultaneously. Within the context of the left and right instruction queues 1040, 1050, the 64-bit instructions are each defined by their respective bits 63-0. One of ordinary skill in the art will appreciate that the instruction register could be partitioned to accommodate more than two instructions within the same data string.

The replication values, stored in bits 62-61 of each of the left and right instructions, are read 1012, 1022 for each of the respective instruction queues 1040, 1050. The instructions in each queue are replicated with the corresponding modifications 1010, 1020 and written into the left and right instruction queues 1040, 1050. The maximum of the replication values 1012, 1022 is determined by comparing 1030 the replication values 1012, 1022 for each of the left and right instruction queues 1040, 1050. The number of no-operation instructions inserted 1014, 1024 in the left and right instruction queues is the difference between the maximum number of replications and the number of replications for each of the corresponding instruction queues. Thus, in the event that one instruction has a greater replication value than the other instruction, the queue with the instruction having the lesser value will have one or more no-operation instructions inserted to balance the number of levels loaded in each queue during that cycle. Alternatively, if both instructions have the same replication value, then the maximum is that same value and the insertion of no-operation instructions is not performed.

By inserting the no-operation instructions, the left and right queues are balanced after decompression. Balancing the queues improves efficiency because the decompression may be performed once per cycle on, for example, a 128-bit data string and an imbalance in the queues may cause a stall affecting all process threads associated with the entire data string.

This type of stall would occur if the capacity of one instruction queue is less than the capacity required by the compression scheme. The resulting stall would affect all threads processed by that instruction register.

Figure 11:
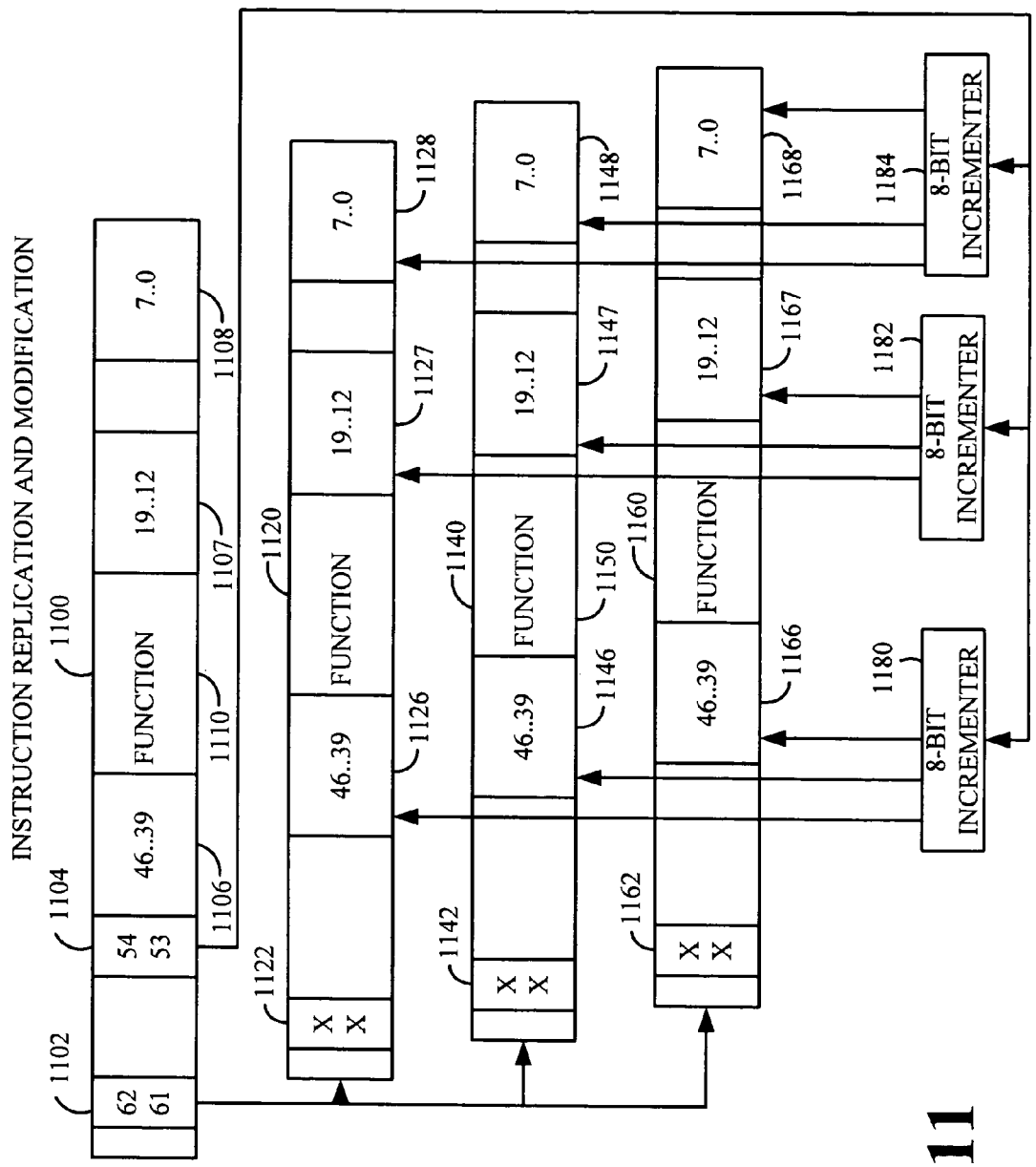
FIG. 11 is a diagram illustrating the replication and modification of instructions in decompression.

One embodiment of replication and modification logic is illustrated in the diagram of FIG. 11. The compressed instruction 1100 contains a replication value in bits 62-61 1102, a field identifier in bits 54-53 1104, up to three different argument fields 1106-1108 and an opcode field which contains the instruction function 1110. The number replications 1102, determines how many of the replicate instructions 1120, 1140, 1160 are generated. As discussed above, the replication value corresponds with the number of instructions compressed into the compressed instruction.

The field identifier bits 1104 selectively enable 8-bit incrementers 1180, 1182, 1184 for modification to the arguments as determined by the field identifier value. For example, in the case where incrementer 1180 is enabled and the replication value 1102 is three, the argument at bits 46-39 1106 of the compressed instruction 1100 is incremented to produce modified arguments 1126, 1146, 1166 for each of the corresponding replicated instructions 1120, 1140, 1160. Applying this to the example above, the R20 argument will be incremented to generate modified arguments R21 and R22. Correspondingly, the R12 will be incremented to generate modified arguments R13 and R14 and R16 will be incremented to generate modified arguments R17 and R18.

Although the above embodiments use examples with three or less replications, one of ordinary skill in the art will appreciate that the replication value and associated field could be modified to a compress a maximum number of instructions more or less than three. Similarly, one of ordinary skill in the art will know that the format of the instruction discussed above is merely exemplary and that the practice of these methods is not limited by this format. Thus, a data format of a different number, capacity and type of fields is contemplated.

The methods of the present invention can be implemented in hardware, software, firmware, or a combination thereof. In the preferred embodiment, the compression and decompression logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A computer system, comprising:
   compression logic configured to compress a plurality of instructions having a same instruction function, wherein each of the plurality of instructions comprises at least one operand, wherein the operands in each of the plurality of instructions are allocated to a plurality of consecutive registers, and wherein a compressed instruction comprises compression data;
   decompression logic configured to decompress the compressed instruction, wherein the compression data is utilized to generate a plurality of decompressed instructions; and
   instruction queue logic configured to store the plurality of decompressed instructions, wherein the instruction queue logic is further configured to partition an instruction register for processing the plurality of decompressed instructions in a first instruction queue and a second instruction queue.

2. The computer system of claim 1, wherein the operand comprises at least one argument data field.

3. The computer system of claim 2, wherein the compression logic is further configured to determine a number of instructions for compression, wherein the number of instructions for compression is stored in a replication value field of the compressed instruction.

4. The computer system of claim 3, wherein each of the plurality of the decompressed instructions comprises a replicate of the compressed instruction including an operand generated by modifying the compressed instruction operand.

5. The computer system of claim 4, wherein a modified operand comprises the compressed instruction operand incremented for each corresponding replicate of the specific instruction function.

6. The computer system of claim 5, the decompression logic further configured to:
   determine a maximum replication value, wherein the maximum replication value is equal to the greater of the replication value of the compressed instruction in the first instruction queue and the greater of the replication value in the second instruction queue;
   insert no-operation instructions in the first instruction queue, wherein the number of no-operation instructions inserted in the first instruction queue is the difference between the maximum replication value and the replication value in the first instruction queue; and
   insert no-operation instructions in the second instruction queue, wherein the number of no-operation instruction inserted in the second instruction queue is the difference between the maximum replication value and the replication value in the second instruction queue.

7. The computer system of claim 6, wherein each of the first and second instruction queues stores instructions for a different processor thread.

8. The computer system of claim 7, wherein the instruction register is 128 bits, wherein each of the first and second instruction queues is 64 bits, wherein each of the first and second instruction queues is seven levels.

9. A method for improving performance in a computer system, comprising the steps of:
compressing a plurality of instructions having a same instruction function, wherein a compressed instruction is generated, and wherein each of the plurality of instructions includes an instruction function applied to a plurality of consecutively addressed operands;
passing the compressed instruction to an instruction register; and
decompressing the compressed instruction, wherein decompressing comprises generating decompressed instructions into a plurality of instruction queues.

10. The method of claim 9, the plurality of instruction queues comprising a first instruction queue and a second instruction queue, wherein the first instruction queue and the second instruction queue each include equal data storage capacity.

11. The method of claim 10, wherein the first instruction queue further comprises a first instruction decoder and the second instruction queue further comprises a second instruction decoder.

12. The method of claim 11, wherein the first instruction queue and the second instruction queue are configured to receive the same number of decompressed instructions,
wherein instructions comprising no operation are stored in the first instruction queue if the number of decompressed instructions in the second instruction queue is greater than the number of decompressed instructions stored in the first instruction queue, and
wherein instructions comprising no operation are stored in the second instruction queue if the number of decompressed instructions in the first instruction queue is greater than the number of decompressed instructions stored in the second instruction queue.

13. The method of claim 12, wherein the compressed instruction further comprises:
a first compression data field, for storing the number of instructions compressed; and
a second compression data field, for storing an operand field identifier, wherein the operand field identifier comprises data regarding the selection of operands for modification.

14. The method of claim 13, the step of decompressing further comprising the steps of:
replicating the compressed instruction, wherein the number of times the compressed instruction is replicated is equal to the number of instructions compressed;
modifying the compressed instruction operands in the decompressed instructions, wherein the instruction operands are incremented each time the instruction field is replicated; and
storing a replicated instruction in one of the plurality of instruction queues.

15. The method of claim 14, wherein the instruction register comprises 128 bits, and wherein the first and second instruction queues each comprise 64 bits.

16. The method of claim 15, wherein each of the plurality of instruction queues the first compression data field comprises two bits, and wherein the second compression data field comprises two bits.

17. Computer hardware, comprising:
means for saving system instruction space using compression of a plurality of instructions, wherein each of the plurality of instructions has a same instruction function and is applied to a plurality of consecutively addressed operands; and
means for decompressing a compressed instruction, wherein the compressed instruction comprises the same instruction function.

18. The computer hardware of claim 17, further comprising:
means for queueing a plurality of decompressed instructions, wherein a data string retrieved from an instruction cache comprises N compressed instructions, and wherein the instruction cache further comprises N partitions.

19. The computer hardware of claim 18, wherein the compressed instruction is decompressed into N instruction queues, wherein each of the N instruction queues stores instructions for a different processor thread, wherein each of the N instruction queues comprises L levels.

20. The computer hardware of claim 17, wherein the means for decompressing further comprises incrementing each of the plurality of operands, wherein each of the plurality of operands in a decompressed instruction corresponds to the plurality of consecutively addressed operands.

* * * * *